United States Patent [19]

Prinz

[11] 3,875,248

[45] Apr. 1, 1975

[54] IMPROVED PROCESS FOR CRYSTALLIZING PENTAERYTHRITOL FROM AQUEOUS SOLUTIONS

[75] Inventor: Roy H. Prinz, Robstown, Tex.

[73] Assignee: Celanese Corp., New York, N.Y.

[22] Filed: Oct. 22, 1970

[21] Appl. No.: 83,184

[52] U.S. Cl. .......................................... 260/637 P
[51] Int. Cl. .......................................... C07c 29/24
[58] Field of Search .................................. 260/637 P

[56] References Cited
UNITED STATES PATENTS

| | | | |
|---|---|---|---|
| 2,373,717 | 4/1945 | Spiller | 260/637 P |
| 2,562,102 | 7/1951 | Jackson et al. | 260/637 P |
| 2,696,507 | 12/1954 | Cake | 260/637 P |

OTHER PUBLICATIONS

Rohm, et al., Technical Bulletin, pp. 1–10, 1966.

*Primary Examiner*—Joseph E. Evans
*Attorney, Agent, or Firm*—Ralph M. Pritchett

[57] ABSTRACT

In recovering pentaerythritol by crystallization from an aqueous solution containing the by-products characteristically formed during the reaction of formaldehyde, acetaldehyde, and a base to produce an aqueous reaction product from which the pentaerythritol is subsequently recovered by concentration followed by crystallization, the rate of crystallization and the efficiency of pentaerythritol recovery are improved by passing the liquid reaction product, typically after the concentration step, through a bed of an organic, water-insoluble, non-ionic, hydrated, porous polymer of the type generally referred to as macroreticular resin and typically consisting of polystyrene cross-linked with divinyl benzene. This treatment removes from the reaction liquor various organic by-products, including specifically sugars, the presence of which has been found to retard the pentaerythritol crystallization process.

10 Claims, No Drawings

IMPROVED PROCESS FOR CRYSTALLIZING PENTAERYTHRITOL FROM AQUEOUS SOLUTIONS

BACKGROUND OF THE INVENTION

Processes for producing pentaerythritol by reacting formaldehyde, acetaldehyde, and a base are well-known in the art and widely used. Although various bases can be employed, including, for example, alkali metal carbonates, pentaerythritol manufacture as generally carried out employs either calcium hydroxide or sodium hydroxide, which in the course of the reaction is converted to the corresponding formate as a result of reaction with a portion of the formaldehyde. When calcium hydroxide is employed, the resulting calcium formate can be removed to a great extent from the reaction liquor by treatment with sulfuric acid to form solid calcium sulfate which is removed by filtration. When sodium hydroxide is employed, the resulting sodium formate remains in the reaction liquor and is either subsequently removed by ion-exchange resin treatments or else separated from the pentaerythritol by concentration and crystallization, the pentaerythritol being recovered by filtration or centrifugation while the sodium formate remains in the mother liquor.

A typical pentaerythritol-production process employing sodium hydroxide is described in U.S. Pat. No. 2,790,836, in which the aqueous reaction product is concentrated by vacuum evaporation after which the concentrated reaction product is cooled to precipitate pentaerythritol cyrstals which are recovered from the resulting magma by centrifugation. The crude crystals are redissolved and recrystallized to produce a purified product; mother liquor from the second crystallization is commonly recycled to the first crystallization step. The mother liquor from the first crystallization step contains the sodium formate along with a very substantial fraction of the pentaerythritol initially formed in the reaction step. The efficiency of recovery of the pentaerythritol is limited by the fact that, in the first crystallization, too high a degree of concentration results in contamination of the product with an excessive amount of sodium formate. In addition, regardless of the problem regarding sodium formate contamination, both crystallization steps present difficulties in that the product does not always crystallize readily to form large, easily-recoverable crystals. The crystals are, rather, often of a small size which results in slow filtration or centrifugation, and there results both a limitation on throughput in the filtration apparatus employed and also difficulty in effectively washing the crystals to attain high purity. For example, there have been extreme instances when the consistency of the crystals was so gummy that one basket load in a centrifugal filter was spun literally for days with the mother liquor lying on top of the filter cake without passing through it at all. Such an occurrence represents the results of unusually poor control in the reaction step of the process, but less severe manifestations of the same problem are experienced in all pentaerythritol-crystallization operations. Even when crystal size is adequately large, it has been observed that pentaerythritol recovery is never quite so complete as would be computed from the solubilities of the pure compounds involved.

In those processes in which calcium hydroxide is employed, with the resulting calcium formate being converted to calcium sulfate which is removed prior to crystallization of the pentaerythritol, similar difficulties are also experienced in crystallizing and recovering the pentaerythritol, unsatisfactorily slow crystal growth tending to hinder rapid filtration of the product crystals from the liquid reaction medium and incomplete attainment of crystallization equilibrium also resulting in loss of pentaerythritol in the mother liquor, either as dissolved material or else as crystals so fine that they pass through whatever filtration medium is employed in recovering the product crystals.

As has been mentioned briefly above, the difficulties just described can be reduced by carefully controlling parameters such as reactant proportions, reaction temperature, etc., in the reaction step of the process and also by employing long crystallization cycles in which sudden thermal shock is carefully avoided. Despite these precautions, however, the art has long recognized that the attainment of equilibrium in the crystallization step is usually incomplete and also that a substantial portion of the product precipitates as crystals which are of comparatively small size and difficult to purify thoroughly, as by washing on the filter.

It is an object of the present invention to provide a method for accelerating pentaerythritol, crystals growth during the recovery of pentaerythritol, by concentration and crystallization, from the reaction liquor produced during the formation of pentaerythritol by reaction between formaldehyde, acetaldehyde, and a base in an aqueous reaction medium. It is another object to increase the recovery efficiency and to improve the size and purity of pentaerythritol crystals formed during the crystallization of pentaerythritol from the aqueous reaction medium after its concentration by evaporation. It is another object to provide a method for separating pentaerythritol form the by-product sugars which are formed during the reaction just named. Other objects will be apparent from the following specification and claims.

SUMMARY OF THE INVENTION

In accordance with the present invention the aqueous solution of pentaerythritol and the by-products characteristically formed during the reaction of formaldehyde, acetaldehyde, and a base, in aqueous solution, to produce pentaerythritol is passed, typically after concentration by evaporation, through a bed of an organic, water-insoluble, non-ionic, hydrated, porous polymer of the type generally referred to as macroreticular resin and typically consisting of polystyrene cross-linked with divinyl benzene prior to crystallization of pentaerythritol therefrom. It has been discovered that this treatment removes certain contaminants which inhibit pentaerythritol crystal growth and that crystallization of pentaerythritol from the macroreticular resin-treated solution, as compared with crystallization from an untreated solution, takes place more rapidly and completely, with the formation of pentaerythritol crystals of improved size and purity in improved yield. The process is particularly applicable to the treatment of reaction liquors formed by reacting acetaldehyde, formaldehyde, and sodium hydroxide in aqueous solution to form pentaerythritol, organic by-products, and sodium formate, with the sodium formate still being present in the aqueous reaction product solution passed through the resin bed. In a preferred embodiment the aqueous reaction product is concentrated by vacuum evaporation prior to the resin treatment, to a solution containing about 25 to 30 weight percent pentaerythritol, and the concentrated solution is passed through the resin bed at a temperature sufficiently high to avoid precipitation of the pentaerythritol therefrom.

DESCRIPTION OF THE PREFERRED EMBODIMENTS

Composition of the Crude Feedstock

The aqueous reaction product solution resulting when pentaerythritol is formed by the methods previously discussed varies in composition depending upon the concentration of the initial reactants in the aqueous solution in which they are reacted, the molar ratio of reactants, the nature of the base employed, and the means employed for disposing of excess formaldehyde initially fed into the reaction (formaldehyde is commonly employed in some stoichiometric excess over the acetaldehyde). Customary practice, it should be noted, is always to remove excess formaldehyde after the reaction step, either by allowing it to condense to sugars (in those processes in which only a small excess of formaldehyde is employed in the reaction step) or else by distilling it out of the aqueous reaction product as described in U.S. Pat. No. 2,790,836, which patent describes a process in which a substantial excess of formaldehyde is employed in the reaction.

However the pentaerythritol-forming reaction is carried out, the substantially formaldehyde-free reaction product contains pentaerythritol, lesser quantities of dipentaerythritol and tripentaerythritol, small quantities of pentaerythritol formals, and formose sugars. The pentaerythritol-dimers and trimers, as well as the formals, tend to cause some difficulty themselves during crystallization of the pentaerythritol, but the formose sugars in particular have been found not only to inhibit pentaerythritol crystal growth but also, as a result of their tendency to caramelize during evaporation of the aqueous reaction product, their presence results in discoloration of the final pentaerythritol product, this being especially undesirable when the pentaerythritol is to be employed in the formulation of white alkyd enamels.

In addition to the organic compounds identified above, the aqueous reaction product also commonly contains sodium formate, in an amount of approximately one mole per mole of pentaerythritol, when sodium hydroxide is employed in the pentaerythritol reaction. As mentioned previously, in those processes which employ calcium hydroxide in place of sodium hydroxide it is common practice to remove the calcium as calcium sulfate prior to recovery of the pentaerythritol, so such reaction products do not customarily contain much of the base cation. It is also possible, if desired, to use ion-exchange methods to remove sodium formate when it is present. The undesired formoses are, however, still present.

Prior to the concentration step (typically a vacuum evaporation) in which the aqueous reaction product is concentrated prior to crystallization of the pentaerythritol, it will be understood that, as described in U.S. Pat. No. 2,790,836, various recycle streams, such as the mother liquor resulting from a second pentaerythritol crystallization, may be incorporated into it. The presence or absence of such recycle streams, which are aqueous solutions of comparatively pure pentaerythritol, does not affect the amenability of the aqueous reaction product to treatment in accordance with the present invention.

While it is to be understood that the present process is by no means restricted to processing feedstocks of this exact composition, a typical concentrated pentaerythritol crystallization feedstock to the treatment of which this invention is applicable contains, by weight, approximately 55 percent water, 26 percent monopentaerythritol, 17 percent sodium formate, 2 percent dipentaerythritol, and 0.10 percent formose sugars along with lesser quantities of pentaerythritol formals. The solution typically has a pH, measured at approximately 100°C, of approximately 6.0 to 6.2. Small quantities of sodium acetate are typically present, as a result of the employment of acetic acid to neutralize excess alkalinity at the end of the reaction step and prior to removal of the formaldehyde by distillation. The feedstock, if it is a concentrated solution as just described, will be at an elevated temperature, e.g., 90°C to 100°C, in order to keep the pentaerythritol and sodium formate in solution during passage through the resin bed. Such elevated temperature is not necessary for any reason other than to prevent such precipitation, and if a dilute solution, e.g., the reaction product prior to concentration, is to be passed through the resin bed it is not necessary that an elevated temperature be employed. That is, the temperature need be only high enough to maintain in solution the pentaerythritol and sodium formate which are present.

Applicable Resins

The resins employed to treat the above-described aqueous feedstock solutions prior to the pentaerythritol crystallization step are synthetic, organic, water-insoluble, non-ionic, hydrated (preferably substantially completely hydrated) porous polymers in bead form which are further characterized by having an unique macroreticular physical porosity, high surface area, and uniform (i.e. substantially uniform) pore-size distribution. They have good thermal stability and can be employed at temperatures of 150°C and higher. Typical of such macroreticular resins are those comprising or consisting essentially of a cross-linked hydrocarbon polymer, for example a co-polymer of a monoethylenically unsaturated aromatic hydrocarbon (e.g., vinyl, allyl, methallyl, etc.-substituted benzene, toluene, dimethyl benzene, ethyl benzene, etc.), cross-linked with a divinyl compound, more particularly a divinyl aromatic compound, and specifically divinyl benzene. The divinyl compound may constitute, for example, from about 3 to about 16 mole percent of the copolymer.

The porous polymers used in practicing the present invention also may be described as synthetic gels consisting essentially of cross-linked hydrophilic chains. They are devoid of ionic groups and are polar in character, which is due almost entirely to their high content of hydroxyl groups.

Commercially-available resins of the above-described type which are applicable in the present process include "Amberlite XAD-1 and XAD-2" (trade names of Rohm and Haas Company, Philadelphia, Pa.), which are understood to be copolymers of styrene and divinyl benzene wherein the divinyl benzene functions as a cross-linking agent. It is estimated that the mole percent of the cross-linking agent is between about 6 and 12 percent. Other typical properties of the "Amberlite XAD-2," which is particularly applicable in the present process, are as follows:

| Property | Amberlite XAD-2 |
| --- | --- |
| Solids (percent) | 51 to 55 |
| Porosity (ml pore/ml bead) | 0.40 to 0.45 |
| Surface area ($m^2$/g-dry basis) | 290 to 330 |
| Effective size (mm) | 0.30 to 0.45 |
| Harmonic mean particle size (mm) | 0.45 to 0.60 |
| Average pore diameter (A) | 85 to 95 |
| True wet density (g/ml) | 1.03 |
| Skeletal density (g/ml) | 1.06 |
| Bulk density (g/cc) | 0.64 to 0.70 |

The above-described resin is customarily supplied in a completely hydrated state, but when, as by prolonged exposure to air, it has become dried to the point that rewetting with water does not permit complete rehydration, it is rehydrated before use by immersion in methanol for about 15 minutes followed by washing with approximately 20 bed volumes of water at a rate of about 2 gallons per cubic foot of resin bed per minute.

Other applicable macroreticular resins which are applicable include "Amberlite IRA-93," also a trade name of Rohm and Haas Company, and "Dowex 11," a trade name of Dow Chemical Company, Midland, Mich. "Amberlite XAD-1," and "Amberlite XAD-2," have been found particularly effective, however.

Adsorption and Elution Steps

The adsorption step of the process, i.e., the step in which the pentaerythritol solution to be treated is contacted with the macroreticular resin, is advantageously carried out by passing the solution downwardly through a bed of the resin at a rate of approximately two volumes of solution per volume of resin bed per hour at a temperature sufficiently high to prevent precipitation of solids from the solution. Temperatures in excess of about 100°C are not necessary. It will be recognized that lower rates of solution throughput can be employed with no ill effect whatever; higher rate can be employed, e.g. up to about four volumes of solution per volume of resin bed per hour. To prevent channeling it is recommended that the bed have a length: diameter ratio greater that 1, preferably about 25.1. Liquid linear velocity through the bed, expressed as apparent velocity computed on the basis of an empty column, is advantageously about 5 to 10 centimeters per minute.

The number of bed volumes of liquid which can be passed through the resin bed before elution of the bed is required will vary with the foremose sugar content of the liquid feedstock being treated, but, in the case of a feedstock containing about 0.10 weight percent formose sugars, is approximately 60 to 70 volumes of liquid feedstock per bed volume. Bed exhaustion can be recognized by visual observation of the resin in the bed, the "loaded" resin being darker in color than that which is not yet exhausted and a zone of darkened resin growing from the inlet end of the bed toward the outlet end as the bed is progressively exhausted.

When the bed has been exhausted, i.e., when the bed has turned dark or when formoses begin to appear in the effluent in appreciable quantity, it can be regenerated to its initial activity level by elution with methanol, advantageously in an amount of at least about two bed volumes of methanol per volume of resin bed. The flow rate of methanol through the bed during the elution step is advantageously essentially the same as the liquid flow rate discussed previously for the adsorption cycle. Following the methanol elution, water backwashing is recommended to remove the methanol, although methanol removal is not essential, and also to hydraulically reclassify the resin to minimize channeling in the subsequent elution step.

For "Amberlite XAD-2" resin, it has been determined that the resin bed has a capacity of approximately 4.5 grams of formose sugar per 100 cubic centimeters of resin bed.

The following example is given to illustrate the practice of the invention. It will be recognized that many variations can be made therefrom within the scope of the invention.

EXAMPLE I

A feedstock was employed comprising the concentrated reaction product of a pentaerythritol process substantially as described in U.S. Pat. No. 2,790,836, in which the reaction product was being concentrated by vacuum evaporation and then subjected to a crystallization and a recrystallization to recover the pentaerythritol. Mother liquors from the recrystallization step were being recycled to the first crystallization step and were included in the feed liquor to the first crystallization. The feedstock was an aqueous solution containing, by weight, approximately 55 percent water, 26 percent mono-pentaerythritol, 2 percent dipentaerythritol and tripentaerythritol, 17 percent sodium formate, and 0.10 percent formose sugars.

At a temperature of 95°C, the feedstock was passed downwardly, at substantially atmospheric pressure, through a 21 mm by 500 mm bed of Rohm and Haas "XAD-2" resin at the rate of 6 ml per minute for approximately 120 minutes. The collected effluent was then allowed to cool to room temperature. Pentaerythritol crystals precipitated as cooling took place, and the degree of precipitation was determined during the cooling process by filtering out and weighing the precipitated pentaerythritol when the temperature had reached 66°C, when it had reached 45°C, when it had reached 30°C, and when it had reached 25°C. At 25°C, 31.6 grams of crystals had been precipitated per 100 grams of initial liquid feedstock.

An identical batch of liquid feedstock which had not been treated with the macroreticular resin was allowed to cool in the same manner, with the crystals being filtered out and weighed during the cooling process in the same maanner as with the treated feedstock. At each temperature level the amount of pentaerythritol which had crystallized from the untreated liquid was substantially less than that which, at the same temperature level, had crystallized from the untreated liquid was substantially less than that which, at the same temperature level, had crystallized from the treated liquid; specifically, the comparative results were as follows:

| Temperature °C | Grams Crystals Formed per 100 Grams Feedstock | |
| --- | --- | --- |
| | Treated Sample | Untreated Sample |
| 66 | 19.5 | 16.6 |
| 45 | 24.5 | 22.0 |
| 30 | 28.8 | 25.3 |
| 25 | 31.6 | 28.2 |

In addition to the improvement in crystal yield from the treated sample as compared with the untreated, the crystals obtained from the treated sample were observed to filter more rapidly. They were also whiter in color.

The resin bed described above, when it had been loaded with formose sugars by being employed to treat about 64 bed volumes of the feedstock identified above, was regenerated at about 25°C by passing two bed volumes of methanol through the bed at the rate of approximately 12 volumes of methanol per volume of bed per hour followed by passing four bed volumes of water through the bed at about 20 ml per minute. The regenerated bed was observed to have the same formose adsorption capacity as before.

Although methanol is an effective and inexpensive solvent for use in eluting the resin bed as just described, effective bed regeneration also obtains when, in place of methanol, the bed is washed with other lower alkanols such as ethanol, isopropanol, and n-propanol. Elution with liquids which are not good solvents for formoses is not, however, recommended.

The embodiments of the invention in which an exclusive property or privilege is claimed are defined as follows:

1. In a process for recovering pentaerythritol from an aqueous solution containing pentaerythritol and the formose sugars characteristically formed as by-products during the reaction of formaldehyde, acetaldehyde, and a base which is a member of the group consisting of sodium hydroxide and calcium hydroxide to produce pentaerythritol, which process comprises the steps of concentrating said solution, cooling the resulting concentrate to precipitate pentaerythritol crystals therefrom, and separating the product pentaerythritol crystals from the mother liquor, the improvement which comprises:

improving the rate of precipitation and quality of said pentaerythritol crystals by passing said aqueous solution, prior to said cooling step, through a bed of beads of an organic water-insoluble, non-ionic, hydrated, porous polymer which is characterized by macroreticular porosity, high surface area, and uniform pore-size distribution.

2. The improvement of claim 1 wherein the polymer is a cross-linked aromatic hydrocarbon polymer, said base is sodium formate and said aqueous solution contains sodium formate, and the aqueous solution is passed through said bed after said concentration step and at a temperature which is above that at which precipitation of pentaerythritol crystals from the concentrate begins to take place.

3. The improvement of claim 2 wherein the polymer is a cross-linked polymer of styrene.

4. The improvement of claim 3 wherein said base is sodium hydroxide and wherein said concentrate contains sodium formate.

5. The improvement of claim 4 wherein the polymer is a cross-linked copolymer of styrene and a divinyl aromatic hydrocarbon.

6. The improvement of claim 5 wherein the divinyl aromatic hydrocarbon is divinyl benzene, said divinyl benzene constituting from about 3 to about 16 mole percent of the copolymer and wherein the solution is passed through the bed at a temperature not exceeding about 100°C.

7. The improvement of claim 6 comprising the additional step of periodically regenerating said bed by passing a liquid lower alkanol of up to about three carbon atoms therethrough to remove absorbed sugars therefrom.

8. The improvement of claim 7 wherein the lower alkanol is methanol.

9. The improvement of claim 7 wherein said polymer is further characterized by the following properties:

| Property | Approximately |
| --- | --- |
| Solids, % | 51 to 55 |
| Porosity, ml pores/ml bead | 0.40 to 0.45 |
| Surface area, sq. m/gm dry basis | 290 to 330 |
| Average pore diameter, A | 85 to 95 |
| True wet density, gm/ml | 1.03 |
| Skeletal density, gm/ml | 1.06 |
| Bulk density, gm/cc | 0.64 to 0.70. |

10. The improvement of claim 9 further characterized by the step of periodically washing said bed with methanol at substantially ambient temperature to remove absorbed sugars therefrom, followed by washing with water prior to again passing said aqueous solution through said bed.

* * * * *